United States Patent
Yoshikawa et al.

(10) Patent No.: US 10,808,823 B2
(45) Date of Patent: Oct. 20, 2020

(54) TOOTHED PULLEY

(71) Applicant: BANDO CHEMICAL INDUSTRIES, LTD., Kobe-shi, Hyogo (JP)

(72) Inventors: Motoyoshi Yoshikawa, Kobe (JP); Eiichiro Ikeda, Kobe (JP)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 16/843,746

(22) Filed: Apr. 8, 2020

(65) Prior Publication Data

US 2020/0232550 A1  Jul. 23, 2020

Related U.S. Application Data

(63) Continuation of application No. PCT/JP2019/014505, filed on Apr. 1, 2019.

(30) Foreign Application Priority Data

Jun. 19, 2018 (JP) ................. 2018-116071

(51) Int. Cl.
| | | |
|---|---|---|
| *F16H 55/06* | (2006.01) | |
| *C08K 7/10* | (2006.01) | |
| *C08K 7/14* | (2006.01) | |
| *C08L 77/00* | (2006.01) | |
| *B29D 15/00* | (2006.01) | |
| *F16H 55/17* | (2006.01) | |
| *B29K 77/00* | (2006.01) | |
| *B29K 309/08* | (2006.01) | |

(52) U.S. Cl.
CPC ............. *F16H 55/06* (2013.01); *C08K 7/10* (2013.01); *C08K 7/14* (2013.01); *C08L 77/00* (2013.01); *F16H 55/171* (2013.01); *B29D 15/00* (2013.01); *B29K 2077/00* (2013.01); *B29K 2309/08* (2013.01); *C08K 2201/005* (2013.01)

(58) Field of Classification Search
CPC ......... F16H 55/06; F16H 55/171; C08K 7/10; C08K 7/14; C08K 2201/005; C08L 77/00; B29D 15/00; B29K 2077/00; B29K 2309/08
USPC ......................................................... 524/493
See application file for complete search history.

(56) References Cited

U.S. PATENT DOCUMENTS 9,873,793 B2 * 1/2018 Masunaga ................ C08J 3/005
2003/0045621 A1 3/2003 Aramaki et al.
(Continued)

FOREIGN PATENT DOCUMENTS

| CN | 1362980 A | 8/2002 |
| CN | 1375515 A | 10/2002 |

(Continued)

OTHER PUBLICATIONS

Search Report dated May 24, 2019 as received in Application No. PCT/JP2019/014505.
(Continued)

*Primary Examiner* — William K Cheung
(74) *Attorney, Agent, or Firm* — Maschoff Brennan

(57) ABSTRACT

A toothed pulley P is made with a thermoplastic resin and includes a pulley body with an outer circumference along which teeth are arranged at a constant pitch. The pulley body is made of a resin composition containing a copolymer of nylon 6T and nylon 11 and glass fibers with a flat cross section.

20 Claims, 1 Drawing Sheet

(56) References Cited

U.S. PATENT DOCUMENTS

| | | |
|---|---|---|
| 2003/0096070 A1 | 5/2003 | Matsuoka et al. |
| 2009/0131547 A1 | 5/2009 | Maeshima et al. |
| 2012/0238680 A1 | 9/2012 | Chang et al. |

FOREIGN PATENT DOCUMENTS

| | | |
|---|---|---|
| CN | 1688561 A | 10/2005 |
| CN | 1730557 A | 2/2006 |
| JP | 2009-222110 A | 10/2009 |
| JP | 2011-208114 A | 10/2011 |
| JP | 2016-166335 A | 9/2016 |
| JP | 2018-059621 A | 3/2018 |

OTHER PUBLICATIONS

Written Opinion dated Apr. 6, 2019 as received in Application No. PCT/JP2019/014505.

\* cited by examiner

TOOTHED PULLEY

CROSS-REFERENCE TO RELATED APPLICATION

This is a continuation of International Patent Application No. PCT/JP2019/014505 filed on Apr. 1, 2019, which claims priority to Japanese Patent Application No. 2018-116071 filed on Jun. 19, 2018, the entire disclosure of which is incorporated by reference herein.

TECHNICAL FIELD

The present invention relates to a toothed pulley.

BACKGROUND ART

In view of reducing the weight, metal components are often replaced with resin components. For example, Japanese Patent No. 6266832 discloses a resin gear with a gear body made of a resin composition containing a base resin blended with an acid-modified olefin elastomer, and dispersed carbon fibers. The base resin contains, as a main component, polyamide such as a copolymer of nylon 6T and nylon 11.

SUMMARY

The present invention provides a toothed pulley made with a thermoplastic resin and including a pulley body with an outer circumference along which teeth are arranged at a constant pitch. The pulley body is made of a resin composition containing a copolymer of nylon 6T and nylon 11 and glass fibers with a flat cross section.

DETAILED DESCRIPTION

An embodiment will now be described in detail.

Figure 1:
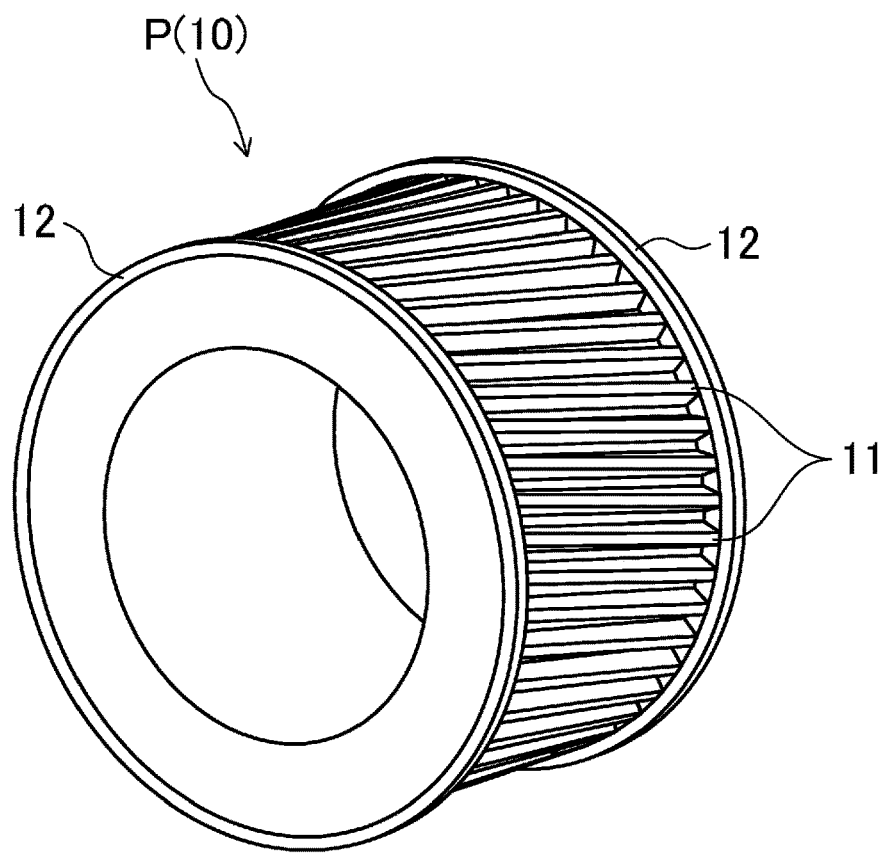
FIG. 1 is a perspective view of a toothed pulley according to an embodiment.

FIG. 1 shows a toothed pulley P according to an embodiment. The toothed pulley P according to this embodiment is used as a driven pulley in a toothed belt transmission of, for example, a driving mechanism such as an electric power steering, a door mirror, a rear slide door, or a brake system, or a deceleration mechanism.

The toothed pulley P according to the embodiment is made with a thermoplastic resin and has a cylindrical pulley body 10 made of a resin composition. The pulley is composed only of the pulley body 10. In addition to the pulley body 10, the toothed pulley P according to the embodiment may include, for example, a shaft attaching metal member fitted in the pulley body 10. The toothed pulley P according to the embodiment has an outer diameter within the range from 60 mm to 110 mm, for example, an inner diameter within the range from 40 mm to 55 mm, for example, and a width within the range from 20 mm to 45 mm, for example.

Along the outer circumference of the pulley body 10, a plurality of teeth 11 are arranged at a constant pitch. The teeth 11 are what is called "helical tooth" extending obliquely with respect to the width direction. The tilt angle falls within the range from 5° to 15° in one suitable embodiment in view of reducing noise at the time of meshing transmission. Alternatively, the teeth 11 may extend in the width direction.

The teeth 11 may be trapezoidal teeth in a trapezoidal shape, circular teeth in a semicircular shape, or in any other shape in a side view. The number of teeth falls within the range from 90 to 165, for example. The teeth 11 have a height within the range from 0.5 mm to 2 mm, for example, and a width within the range from 0.5 mm to 2 mm, for example. On both sides of the pulley body 10, flanges 12 are integrally provided.

The resin composition (hereinafter referred to as "resin composition X") of the pulley body 10 contains a matrix material and a dispersion material dispersed in the matrix material. The volume content of the matrix material in the resin composition X falls within the range, suitable from 50.0 vol % to 70.0 vol %, more suitable from 55.0 vol % to 65.0 vol %. The volume content of the dispersion material in the resin composition X falls within the range, suitable from 30.0 vol % to 50.0 vol %, and more suitable from 35.0 vol % to 45.0 vol %.

The resin composition X contains, as the matrix material, a copolymer (hereinafter referred to as "nylon 6T/11") of polyhexamethylene terephthalamide (nylon 6T) and polyundecaneamide (nylon 11).

The molar fraction of the structural unit of nylon 6T in nylon 6T/11 falls within the range from 55 mol % to 75 mol % in one suitable embodiment. The molar fraction of the structural unit of nylon 11 in nylon 6T/11 falls within the range from 25 mol % to 45 mol % in one suitable embodiment. The volume content (A) of nylon 6T/11 in the resin composition X falls within the range, suitable from 45.0 vol % to 60.0 vol %, and more suitable from 50.0 vol % to 55.0 vol %.

In view of reducing damage to the toothed belt, the resin composition X contains an acid-modified polyolefin as the matrix material in one suitable embodiment. The acid-modified polyolefin is a compound obtained by bonding, to polyolefin, one or more kinds of an unsaturated carboxylic acid, an acid anhydride thereof, and derivatives thereof. Examples of the polyolefin include: homopolymers such as polyethylene, polypropylene, poly-1-butene, and poly-4-methyl-1-pentene; and copolymers of ethylene and α-olefin such as propylene, 1-butene, 1-hexene, 1-octene, and 4-methyl-1-pentene. Examples of the unsaturated carboxylic acid include an acrylic acid, a methacrylic acid, a maleic acid, a fumaric acid, a crotonic acid, and an itaconic acid. The acid-modified polyolefin contains one or more of these combinations in one suitable embodiment, a maleic anhydride-modified polyolefin in a more suitable embodiment, and a maleic anhydride-modified ultra-high molecular weight polyethylene (with a molecular weight of one million or more) in a yet more suitable embodiment. The volume content (B) of the acid-modified polyolefin in the resin composition X falls within the range, suitable from 1.0 vol % to 5.0 vol %, and more suitable from 2.0 vol % to 4.0 vol %.

In this case, the volume content (B) of the acid-modified polyolefin in the resin composition X is lower than the content (A) of nylon 6T/11 in one suitable embodiment. The ratio (A/B) of the content (B) of the acid-modified polyolefin to the volume content (A) of the nylon 6T/11 in the resin composition X falls within the range, suitable from 0.025 to 0.040, and more suitable from 0.030 to 0.035. The matrix material of the resin composition X may have an islands-in-sea structure in which islands of the acid-modified polyolefin are dispersed in a sea of nylon 6T/11.

The resin composition X contains, as the dispersion material, glass fibers with a flat cross section (hereinafter referred to as "flat glass fibers"). The flat glass fibers may have a cocoon or oval cross section, for example.

The flat glass fibers have a width within the range, suitable from 20 μm to 50 μm, and more suitable from 30 μm to 40 μm, and a thickness within the range, suitable from 3 μm to 10 μm, and more suitable from 5 μm to 7 μm. When being blended, the flat glass fibers have a length, for example, within the range from 2 mm to 4 mm. The fibers are broken or damaged by kneading to be shorter than that at the time of blending and contained in the resin composition X. The volume content (C) of the flat glass fibers in the resin composition X falls within the range, suitable from 20.0 vol % to 50.0 vol %, and more suitable from 25.0 vol % to 45.0 vol %. In addition to the flat glass fibers, the resin composition X may contain glass fibers with a circular cross section (hereinafter referred to as "circular glass fibers").

In view of reducing the expression of anisotropy and improving dimensional stability, the resin composition X contains spherical fused silica as the dispersion material in one suitable embodiment. The spherical fused silica has a 50% particle size (D50: median diameter) within the range, suitable from 15 μm to 30 μm, and more suitable from 17 μm to 25 μm. The volume content (D) of the spherical fused silica in the resin composition X falls within the range, suitable from 3.0 vol % to 15.0 vol %, and more suitable from 5.0 vol % to 12.0 vol %.

The volume content (D) of the spherical fused silica is lower than the volume content (C) of the flat glass fibers in the resin composition X in one suitable embodiment. The ratio (D/C) of the content (D) of the spherical fused silica to the volume content (C) of the flat glass fibers in the resin composition X falls within the range, suitable from 0.20 to 0.40, and more suitable from 0.25 to 0.35.

The resin composition X may contain, as the matrix material, a compound other than nylon 6T/11 and the acid-modified polyolefin, and may also contain, as the dispersion material, a material other than the flat glass fibers and the spherical fused silica.

In view of reducing dimensional change caused by water absorption, the resin composition X has a percentage of water absorption of suitable 0.20% or less, and more suitable 0.15% or less. The percentage of water absorption is measured under JIS K7209:2000.

The resin composition X has a flexural strength of suitable 280 MPa or more, and more suitable 300 MPa or more. The flexural modulus is suitable 12.0 MPa or more, and more suitable 15.0 MPa or more. These flexural strength and flexural modulus are measured under JIS K7171:2016.

The toothed pulley P according to the embodiment can be manufactured using an injection molding machine. The matrix material containing nylon 6T/11 and the dispersion material containing the flat glass fibers are fed through a hopper, and heated and kneaded in a cylinder to prepare a molten resin composition X, which is injected to fill a cavity of a mold in the shape of the toothed pulley P and then cooled.

Figure 2:
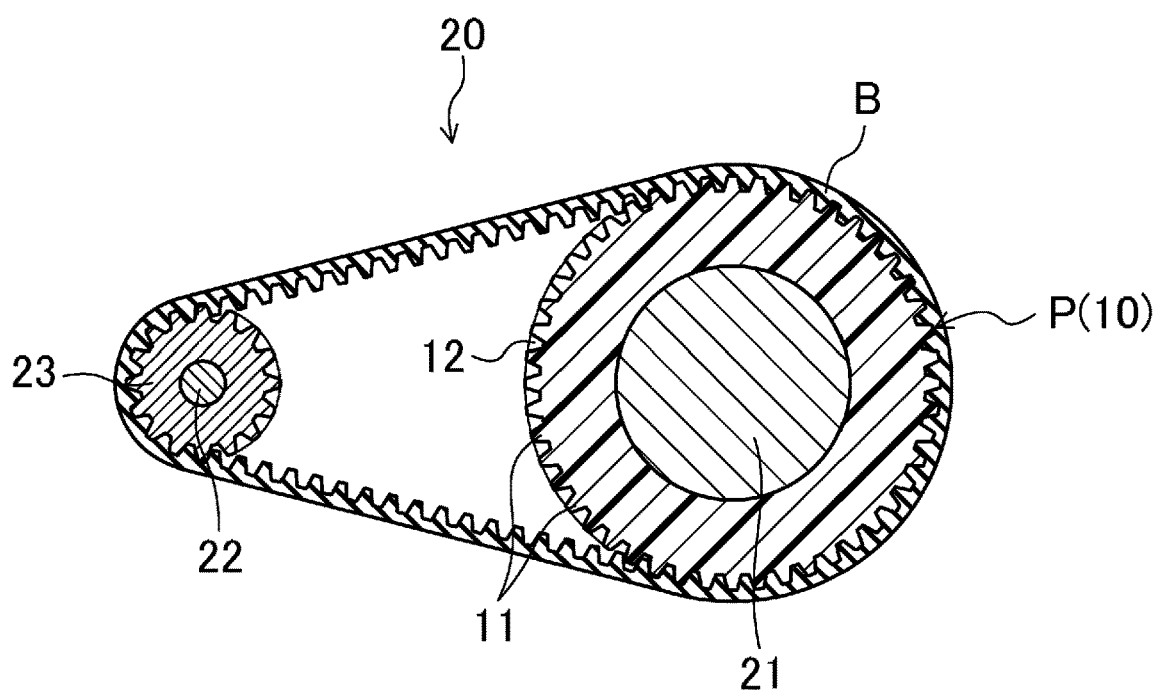
FIG. 2 shows a toothed belt transmission using the toothed pulley according to the embodiment.

FIG. 2 shows a toothed belt transmission 20 using the toothed pulley P according to the embodiment.

This toothed belt transmission 20 is configured as follows. The toothed pulley P according to the embodiment is, as a driven pulley, attached to a driven shaft 21. At a side thereof, a driving shaft 22 is disposed, to which a driving pulley 23 with a smaller number of teeth is attached. The pulleys P and 23 are wound with a toothed belt B having helical teeth whose surfaces are covered with a reinforcing fabric. In the toothed belt transmission 20, the toothed belt B may travel in one direction or reciprocate in one and opposite directions.

In the toothed pulley P according to the embodiment described above, the pulley body 10 is made of the thermoplastic resin which is the resin composition X containing nylon 6T/11 and the flat glass fibers. This configuration provides excellent dimensional stability. This may be because the use of nylon 6T/11 with a low water absorption reduces the dimension change itself caused by the water absorption, and the use of the flat glass fibers reduces the anisotropy of the dimensional change.

In addition, the toothed pulley P according to the embodiment reduces damage to the toothed belt, specifically, wear of the reinforcing fabric covering the surfaces of the tooth. This may be because nylon 6T/11 has a relatively low hardness, and the flat glass fibers come into surface contact with the toothed belt.

EXAMPLES (Toothed Pulley)

The toothed pulleys according to Examples 1 to 3 and Comparative Examples 1 to 4, which will be described below, were prepared. The composition of each belt will also be shown in Table 1.

Example 1

A resin composition containing 59.5 vol % nylon 6T/11 (VYLOAMIDE MJ-300 manufactured by Toyobo Co., Ltd.), and 40.5 vol % flat glass fibers (CSG3PA-820 manufactured by Nitto Boseki Co., Ltd. with a width of 30 μm to 40 μm, a thickness of 5 μm, an initial fiber length of 3.0 mm) was injection-molded into a toothed pulley with helical teeth according to Example 1. The toothed pulley has an outer diameter of 70.5 mm, a width of 32.0 mm, and 111 teeth (the same applies to the following examples).

Example 2

A resin composition containing 59.5 vol % nylon 6T/11, 30.5 vol % flat glass fibers, and 10.0 vol % spherical fused silica (FB-9454 manufactured by Denka Company Limited with a D50 of 20 μm) was injection-molded into a toothed pulley with helical teeth according to Example 2.

Example 3

A resin composition containing 59.5 vol % nylon 6T/11, 30.5 vol % flat glass fibers, 8.0 vol % spherical fused silica, and 2.0 vol % maleic anhydride-modified ultra-high molecular weight polyethylene (LY1040 manufactured by Mitsui Chemicals, Inc. with a molecular weight of two million) was injection-molded into a toothed pulley with helical teeth according to Example 3.

Comparative Example 1

A resin composition containing 59.5 vol % nylon 9T (Genestar N1000A manufactured by KURARAY CO., LTD.) and 40.5 vol % circular glass fibers (ECS03-615 manufactured by Central Glass Co., Ltd. with an outer diameter of 9 μm and an initial fiber length of 3.0 mm) was injection-molded into a toothed pulley with helical teeth according to Comparative Example 1.

Comparative Example 2

A resin composition containing 59.5 vol % nylon 4,6 (Stanyl TS341N manufactured by DSM Engineering Plastics) and 40.5 vol % circular glass fibers was injection-molded into a toothed pulley with helical teeth according to Comparative Example 2.

Comparative Example 3

A resin composition containing 84.3 vol % nylon 6,6 (Ultramid A3W manufactured by BASF Corporation) and 15.7 vol % circular glass fibers was injection-molded into a toothed pulley according to Comparative Example 3.

Comparative Example 4

A resin composition containing 59.5 vol % nylon 9T and 40.5 vol % flat glass fibers was injection-molded into a toothed pulley according to Comparative Example 4.

<Belt Running Test>

Belt running tests were suitable with a belt running test machine with the same or similar layout to that shown in FIG. 2 using the toothed pulleys according to Examples 1 to 3 and Comparative Examples 1 to 4 as the driven pulleys. The driving pulley has an outer diameter of 25.6 mm. The driving pulley and each driven pulley to be tested were wound with a toothed belt with helical teeth whose surfaces are covered with a reinforcing fabric. With a tension of 100 N applied to the toothed belt, the driving pulley rotated at a rotational speed of 2000 rpm. When the reinforcing fabric was worn, and some teeth were chipped, the running belt was stopped. The belt running time until then was referred to as a "belt duration time." The longest belt running time was 200 hours.

In addition, the reinforcing fabric on the surfaces of the tooth of each toothed belt after the belt running tests were visually observed. The damage to the belt was evaluated into the following four levels: A: wear of the reinforcing fabric

TABLE 1

|  |  |  | Example | | | Comparative Example | | | |
|---|---|---|---|---|---|---|---|---|---|
|  |  |  | 1 | 2 | 3 | 1 | 2 | 3 | 4 |
| Resin Composition (vol %) | Matrix Material | Nylon 6T/11 (A) | 59.5 | 59.5 | 59.5 |  |  |  |  |
|  |  | Nylon 9T |  |  |  | 59.5 |  |  | 59.5 |
|  |  | Nylon 4, 6 |  |  |  |  | 59.5 |  |  |
|  |  | Nylon 6, 6 |  |  |  |  |  | 84.3 |  |
|  |  | Acid-Modified Polyolefin (B) |  |  | 2.0 |  |  |  |  |
|  | Dispersion Material | Flat Glass Fibers (C) | 40.5 | 30.5 | 30.5 |  |  |  | 40.5 |
|  |  | Circular Glass Fibers |  |  |  | 40.5 | 40.5 | 15.7 |  |
|  |  | Spherical Fused Silica (D) |  | 10.0 | 8.0 |  |  |  |  |
| B/A |  |  | — | — | 0.034 | — | — | — | — |
| D/C |  |  | — | 0.33 | 0.26 | — | — | — | — |
| Specific Gravity |  |  | 1.72 | 1.70 | 1.67 | 1.73 | 1.76 | 1.37 | 1.74 |
| Roundness of Outer Diameter of Teeth (mm) |  |  | 0.18 | 0.14 | 0.15 | 0.21 | 0.29 | 0.30 | 0.19 |
| Percentage of Water Absorption (%) |  |  | 0.14 | 0.13 | 0.13 | 0.15 | 5.4 | 1.6 | 0.15 |
| Flexural Strength (MPa) |  |  | 435 | 355 | 310 | 176 | 255 | 270 | 185 |
| Flexural Modulus (GPa) |  |  | 20.8 | 19.5 | 17.8 | 13.2 | 20.0 | 8.90 | 13.3 |
| Belt Duration Time (hours) |  |  | >200 | >200 | >200 | 145.6 | 167.0 | 89.9 | 153.9 |
| Belt Damage |  |  | B | B | A | D | D | D | D |

(Test Method)

<Roundness of Outer Diameter of Teeth>

With respect to the toothed pulleys according to Examples 1 to 3 and Comparative Examples 1 to 4, the outer diameters at the points of 2.0 mm, 15.0 mm, and 28.0 mm in the width direction were measured. The differences in dimension between the maximum and minimum values were referred to as "roundness of the outer diameter of teeth."

<Specific Gravity>

The specific gravity of the resin composition of each of the toothed pulleys according to Examples 1 to 3 and Comparative Examples 1 to 4 was measured under JIS K7112:1999.

<Percentage of Water Absorption>

The percentage of water absorption of the resin composition of each of the toothed pulleys according to Examples 1 to 3 and Comparative Examples 1 to 4 was measured under JIS K7209:2000.

<Flexural Strength and Flexural Modulus>

The flexural strength and flexural modulus of the resin composition of each of the toothed pulleys according to Examples 1 to 3 and Comparative Examples 1 to 4 was measured under JIS K7171:2016.

is hardly acknowledged; B: wear of the reinforcing fabric is slightly acknowledged; C: significant wear of the reinforcing fabric is acknowledged; and D: the wear of the reinforcing fabric was advanced and some teeth were chipped.

(Test Results)

Table 1 shows the test results.

With reference to Table 1, Examples 1 to 3 where the pulley body is made of the resin composition containing nylon 6T/11 and the flat glass fibers are compared to Comparative Examples 1 to 3 where the pulley body is made of the resin composition containing nylon 9T, nylon 4,6 or nylon 6,6 and the circular glass fibers and Comparative Example 4 where the pulley body is made of the resin composition containing nylon 9T and the flat glass fibers. The comparison demonstrates that the former has a lower roundness of the outer diameter of the teeth and thus has more excellent dimensional stability than the latter. Further, Example 1 where the resin composition of the toothed pulley contains no spherical fused silica is compared to Examples 2 and 3 containing spherical fused silica. The comparison demonstrates that spherical fused silica further increases the dimensional stability.

Examples 1 to 3 exhibit longer belt duration times and lower levels of belt damage than Comparative Examples 1 to 4. This demonstrates that the toothed belts are less damaged. Furthermore, Examples 1 and 2 where the resin composition of the toothed pulley contains no maleic anhydride-modified ultra-high molecular weight polyethylene are compared to Example 3 containing maleic anhydride-modified ultra-high molecular weight polyethylene. The comparison demonstrates that maleic anhydride-modified ultra-high molecular weight polyethylene reduces the damage to the toothed belts.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A toothed pulley made with a thermoplastic resin, the toothed pulley comprising:
   a pulley body with an outer circumference along which teeth are arranged at a constant pitch, wherein
   the pulley body is made of a resin composition containing a copolymer of nylon 6T and nylon 11 and glass fibers with a flat cross section.
2. The toothed pulley of claim 1, wherein
   A molar fraction of a structural unit of nylon 6T in the copolymer of nylon 6T and nylon 11 falls within a range from 55 mol % to 75 mol %.
3. The toothed pulley of claim 1, wherein
   a volume content of the copolymer of nylon 6T and nylon 11 in the resin composition falls within a range from 45.0 vol % 60.0 vol %.
4. The toothed pulley of claim 1, wherein
   the glass fibers have a width within a range from 20 μm to 50 μm, and a thickness within a range from 3 μm to 10 μm.
5. The toothed pulley of claim 1, wherein
   a volume content of the glass fibers in the resin composition falls within a range from 20.0 vol % to 50.0 vol %.
6. The toothed pulley of claim 1, wherein
   the resin composition further contains an acid-modified polyolefin.
7. The toothed pulley of claim 6, wherein
   the acid-modified polyolefin contains a maleic anhydride-modified polyolefin.
8. The toothed pulley of claim 7, wherein
   the acid-modified polyolefin contains a maleic anhydride-modified ultra-high molecular weight polyethylene with a molecular weight of one million or more.
9. The toothed pulley of claim 6, wherein
   a molar content of the acid-modified polyolefin in the resin composition falls within a range from 1.0 vol % to 5.0 vol %.
10. The toothed pulley of claim 6, wherein
    the volume content of the acid-modified polyolefin in the resin composition is lower than that of the copolymer of nylon 6T and nylon 11 in the resin composition.
11. The toothed pulley of claim 10, wherein
    a ratio of the volume content of the acid-modified polyolefin to the volume content of the copolymer of nylon 6T and nylon 11 in the resin composition falls within a range from 0.025 to 0.040.
12. The toothed pulley of claim 10, wherein
    the resin composition has an islands-in-sea structure in which islands of the acid-modified polyolefin are dispersed in a sea of the copolymer of nylon 6T and nylon 11.
13. The toothed pulley of claim 1, wherein
    the resin composition further contains spherical fused silica.
14. The toothed pulley of claim 13, wherein
    the spherical fused silica has a 50% particle size within a range from 15 μm to 30 μm.
15. The toothed pulley of claim 13, wherein
    a volume content of the spherical fused silica in the resin composition falls within a range from 3.0 vol % to 15.0 vol %.
16. The toothed pulley of claim 13, wherein
    the volume content of the spherical fused silica in the resin composition is lower than that of the glass fibers in the resin composition.
17. The toothed pulley of claim 16, wherein
    a ratio of the volume content of the spherical fused silica to the volume content of the glass fibers in the resin composition falls within a range from 0.20 to 0.40.
18. The toothed pulley of claim 1, wherein
    the resin composition has a percentage of water absorption of 0.20% or less as measured under JIS K7209:2000.
19. The toothed pulley of claim 1, wherein
    the resin composition has a flexural strength of 280 MPa or more as measured under JIS K7171:2016.
20. The toothed pulley of claim 1, wherein
    the resin composition has a flexural modulus of 12.0 MPa or more as measured under JIS K7171:2016.

* * * * *